US009358572B2

(12) United States Patent
Grontved et al.

(10) Patent No.: US 9,358,572 B2
(45) Date of Patent: Jun. 7, 2016

(54) MOTORIZED VISCOUS MATERIAL DISPENSER

(71) Applicant: Sulzer Mixpac Denmark A/S, Greve (DK)

(72) Inventors: Martin Grontved, Harlev (DK); Jorgen Elmelund, Birkerod (DK)

(73) Assignee: Sulzer Mixpac Denmark A/S, Greve (DK)

( * ) Notice: Subject to any disclaimer, the term of this patent is extended or adjusted under 35 U.S.C. 154(b) by 0 days.

(21) Appl. No.: 14/370,414

(22) PCT Filed: Dec. 27, 2012

(86) PCT No.: PCT/DK2012/050509
§ 371 (c)(1),
(2) Date: Jul. 2, 2014

(87) PCT Pub. No.: WO2013/104363
PCT Pub. Date: Jul. 18, 2013

(65) Prior Publication Data

US 2015/0034675 A1 Feb. 5, 2015

(30) Foreign Application Priority Data

Jan. 12, 2012 (DK) ........................... PA 2012 70019

(51) Int. Cl.
*B65D 88/54* (2006.01)
*G01F 11/00* (2006.01)
*B05C 17/01* (2006.01)
*B05C 17/005* (2006.01)

(52) U.S. Cl.
CPC ......... *B05C 17/012* (2013.01); *B05C 17/00596* (2013.01); *B05C 17/0103* (2013.01); *B05C 17/00553* (2013.01)

(58) Field of Classification Search
CPC ............ B05C 17/012; B05C 17/00596; B05C 17/0103; B05C 17/00553
USPC .......... 222/333, 390, 326, 325, 135, 136, 252
See application file for complete search history.

(56) References Cited

U.S. PATENT DOCUMENTS 6,889,872 B2 5/2005 Herman et al.
2002/0130141 A1* 9/2002 Gardos ............... B05C 17/0103 222/144

(Continued)

FOREIGN PATENT DOCUMENTS

DE 4107479 A1 9/1994
WO 02/060600 A1 8/2002

OTHER PUBLICATIONS

Danish Search Report for Danish Application No. PA 2012 70019 mailed Sep. 17, 2012.

*Primary Examiner* — J. Casimer Jacyna
*Assistant Examiner* — Benjamin R Shaw
(74) *Attorney, Agent, or Firm* — Larson & Anderson, LLC

(57) ABSTRACT

A motorized viscous material dispenser (1), especially a caulking gun, comprises a drive unit (11) with a cylindrical pinion gear, a holder (15) attachable to a front side of the drive unit (11) for receiving at least one container containing viscous material, at least one piston (19), and at least one rack (17) meshing with the cylindrical pinion gear to drive said piston (19). A rear piece (51) attachable to a rear side of the drive unit (11) opposite the front side and a guide piece (45) attachable to the front side of the drive unit (11) comprises guiding apertures (55) through which the rack (17) is extending, whereby the guiding apertures (55) determine the position of the rack (17) relative to the cylindrical pinion gear, when the motorized viscous material dispenser (1) is assembled.

14 Claims, 6 Drawing Sheets

(56) References Cited

U.S. PATENT DOCUMENTS

2004/0045982 A1* 3/2004 Herman ................. A61C 5/064 222/145.5
2009/0039113 A1* 2/2009 Hsu ..................... B05C 17/0103 222/333
2009/0264831 A1 10/2009 Thompson et al.
2012/0118913 A1* 5/2012 Naughton ......... B05C 17/00553 222/137
2012/0118917 A1* 5/2012 Naughton ............... G01F 11/00 222/333

* cited by examiner

MOTORIZED VISCOUS MATERIAL DISPENSER

The present invention relates to a motorized viscous material dispenser, especially a caulking gun, comprising a drive unit with a cylindrical pinion gear, a holder attachable to a front side of the drive unit for receiving at least one container containing viscous material, at least one piston, and at least one rack meshing with the cylindrical pinion gear to drive said piston.

U.S. Pat. No. 6,889,872 discloses a dispenser of the above art wherein two racks are meshing with a single elongated cylindrical pinion gear for dispensing a two-component viscous material, each component being provided in a separate container, such as a sausage packaging. A housing of the drive unit of this dispenser comprises two channels for receiving either of the two racks. This has the disadvantage from a manufacturing point of view that when different types of dispensers are produced having different distance between the racks or having different numbers of racks a dedicated drive unit must be produced for each type of dispenser.

It is an object of the invention to overcome this problem.

The object is achieved by a motorized viscous material dispenser of the above art, wherein a rear piece is attachable to a rear side of the drive unit opposite the front side, and a guide piece is attachable to the front side of the drive unit, said guide piece and said rear piece comprising guiding apertures through which the rack is extending, and said guiding apertures determining the position of the rack relative to the cylindrical pinion gear, when the motorized viscous material dispenser is assembled. Hereby is obtained that a single type or construction of drive unit may be used for manufacturing a variety of dispensers having different numbers of pistons and racks and different spacing between the pistons and racks when more thereof are present. Thus the number of different parts needed to be produced and stocked for manufacturing different types of dispenser is reduced providing generally for more economical manufacture.

In an embodiment the guide piece is a part of the holder.

In an embodiment the drive unit comprises a through channel accommodating the at least one rack, said through channel having a width providing for lateral displacement of the rack in a direction of an axis of the cylindrical pinion gear. This provides for step-less selecting a distance between the racks within a minimum distance and a maximum distance by means of dedicated guide and rear pieces.

In an embodiment the guide piece and the rear piece are fastened to the drive unit by mechanical fasteners such as screws. This provides for simple assembly of the dispenser.

In an embodiment the dispenser comprises more pistons and more racks each rack being guided by apertures of the guide piece and the rear piece. The guide piece and the rear piece may comprise separate apertures for each rack or a single aperture may be provided with recesses to securely guide the racks.

In an embodiment at least one guide rod is extending parallel to the at least one rack. Such guide rod may assists guiding and driving the piston or a part of the piston.

In an embodiment the dispenser comprises an electric motor for driving the pinion gear, and in a further embodiment a battery is provided for energizing the electric motor.

In an embodiment the pinion gear has straight teeth. Hereby a lateral force on the rack in a direction parallel to an axis of the pinion gear is avoided.

In the following the invention will be explained in further detail by way of examples of embodiments having reference to the accompanying drawings in which FIG. 1 shows an embodiment of a caulking gun obliquely from the front and from above, FIG. 2 shows the caulking gun oblique from the rear and from above, FIG. 3 shows a second embodiment of a caulking gun obliquely from the front and from above, FIG. 4 shows the caulking gun of FIG. 3 obliquely from the rear and from above, FIG. 5 shows a drive unit obliquely from the front and from above, FIG. 6 shows the drive unit obliquely from the rear and from above, FIG. 7 shows an embodiment of a holder obliquely from the front and from above, FIG. 8 shows the holder obliquely from the rear and from above, FIG. 9 shows parts of the drive unit obliquely from the front in a horizontal view, FIG. 10 shows a first view from above of the drive unit with two racks, FIG. 11 is a section along the line XI-XI in FIG. 10

For simplicity of the present description terms "up", "down", "front", and "rear" are used to describe mutual relationships of various parts and components of the embodiments of the dispenser according to the present invention. The skilled person will realize that in use the dispenser will normally be turned up, down and around in accordance with any practical task to be performed by means of the dispenser.

Figure 2:
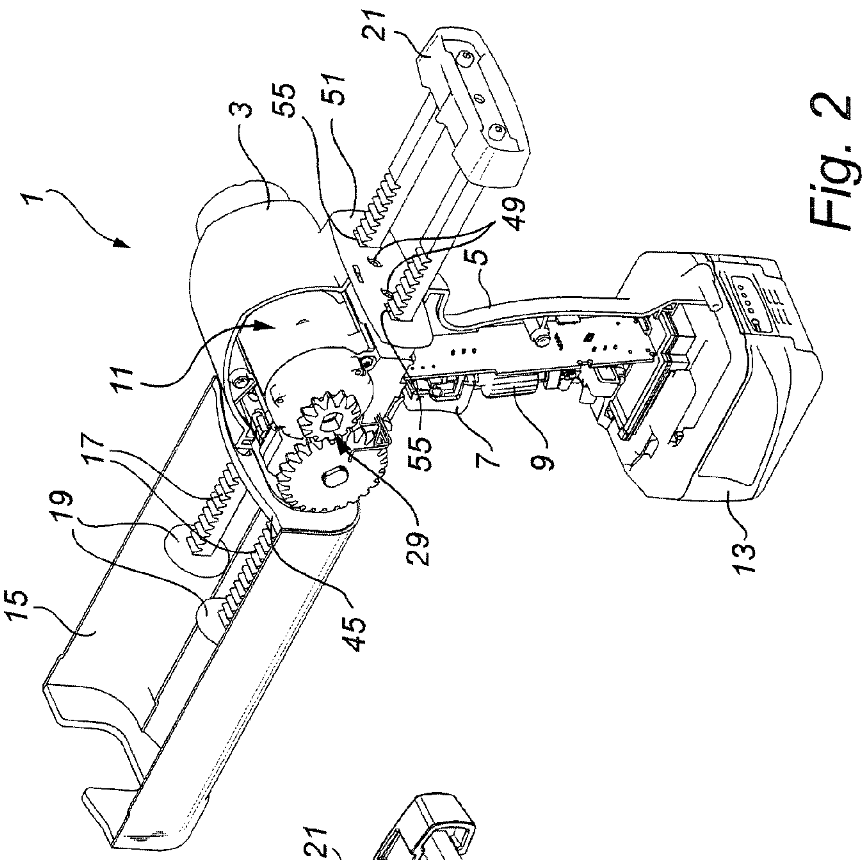
Figure 1:
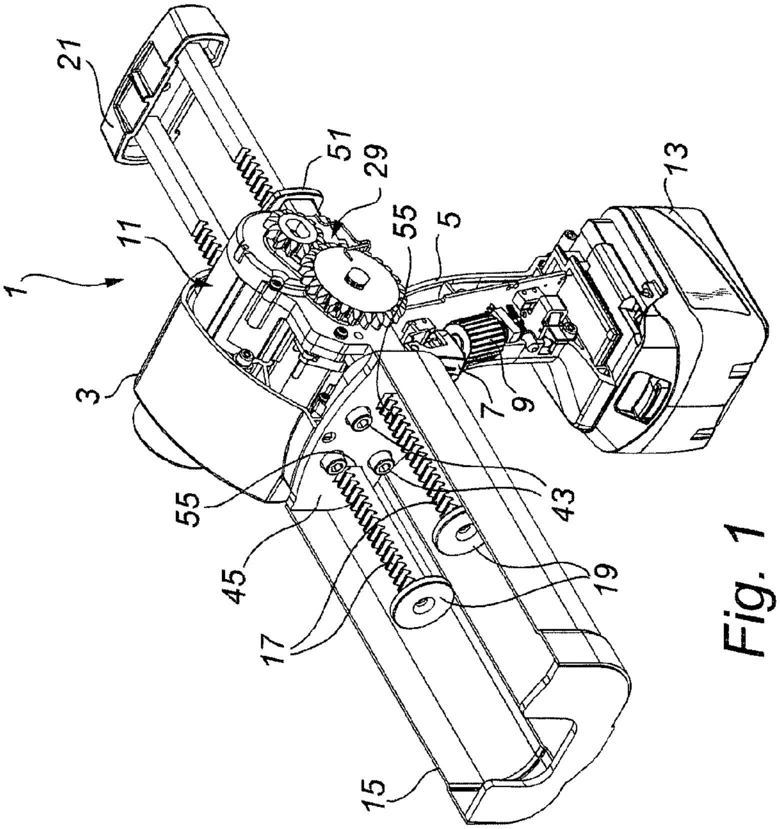
Figure 5:
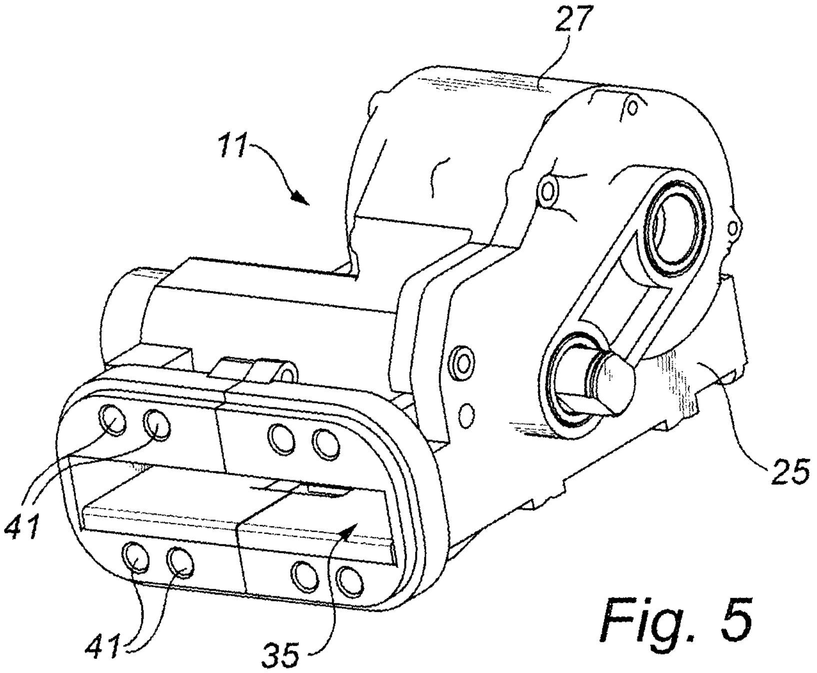
Figure 6:
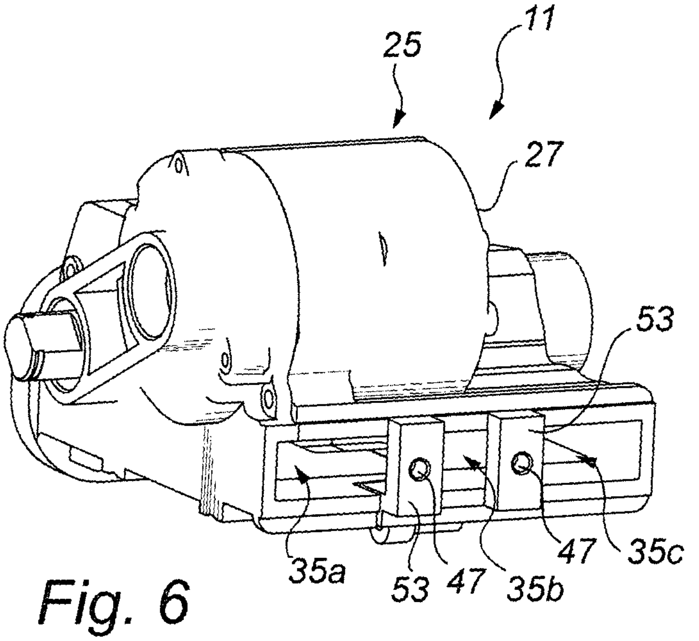
Figure 9:
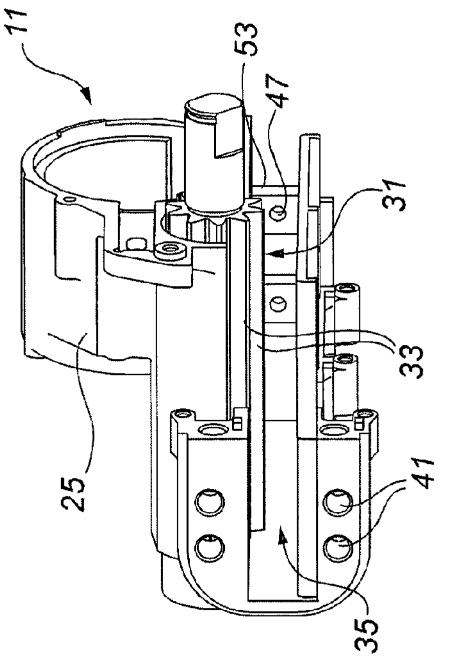

FIGS. 1 and 2 show a motorized viscous material dispenser 1 in an embodiment of the kind, which often is referred to as a caulking gun. It comprises a housing 3, part of which is left out to show interior parts, said housing providing a handle 5 to be grabbed by an operator for operating the dispenser to dispense material. At the handle the dispenser comprises a trigger 7 and a speed control dial 9. The housing 3 accommodates a drive unit 11, parts of which are also shown in i.a. FIGS. 5, 6, and 9. At the bottom of the housing 3 a rechargeable battery pack 13 is attached in a manner normal for portable electric tools. Alternatively the dispenser may e.g. be provided with a cord for connection with a power source such as lighting mains.

Figure 8:
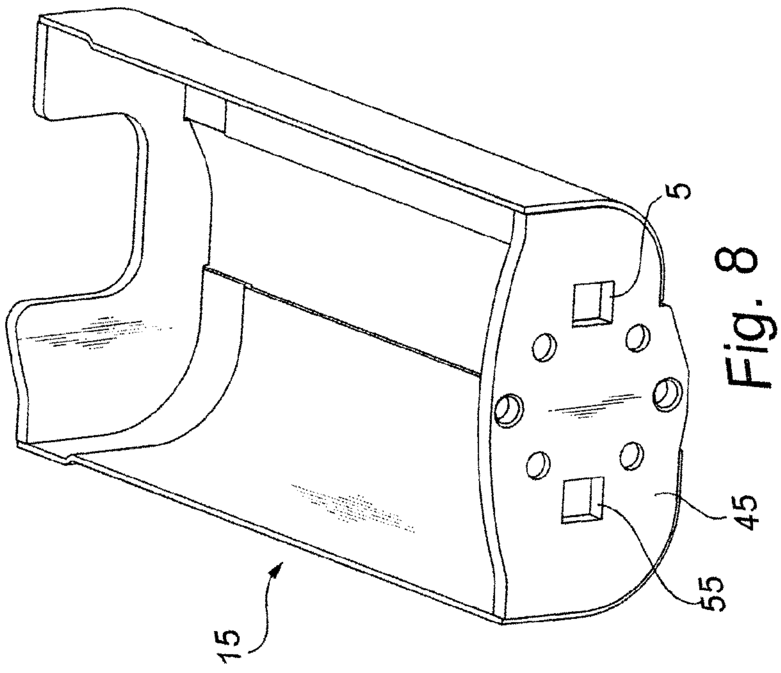
Figure 7:
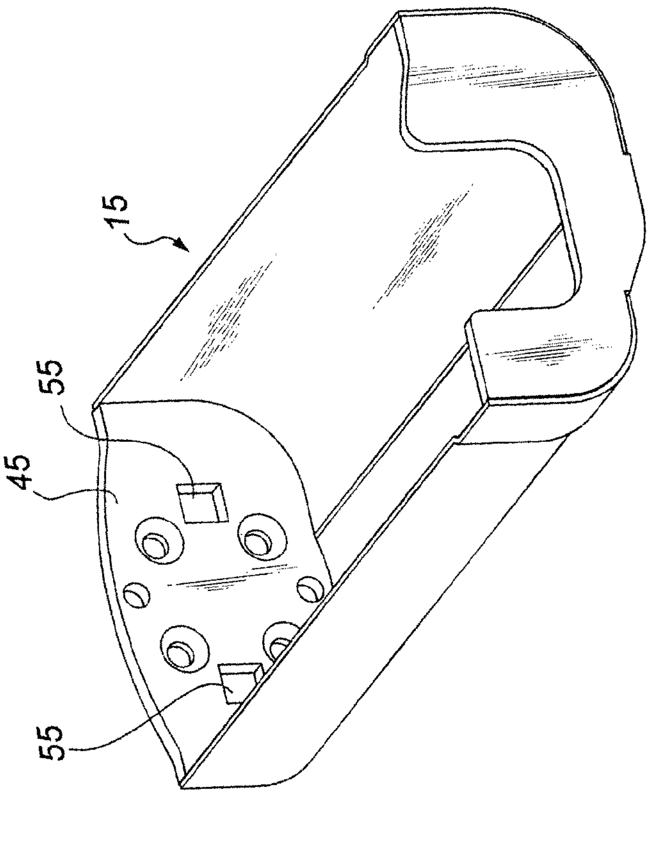

At a front end of the housing 3 and the drive unit 11 a holder 15 for two containers of viscous material to be dispensed is mounted. Thus the holder 15 defines the front end of the dispenser 1. FIGS. 7 and 8 show the holder 15 per se. The containers of viscous material may be of any kind e.g. of cartridge type or of sausage type, which are types well known in the art.

Figure 4:
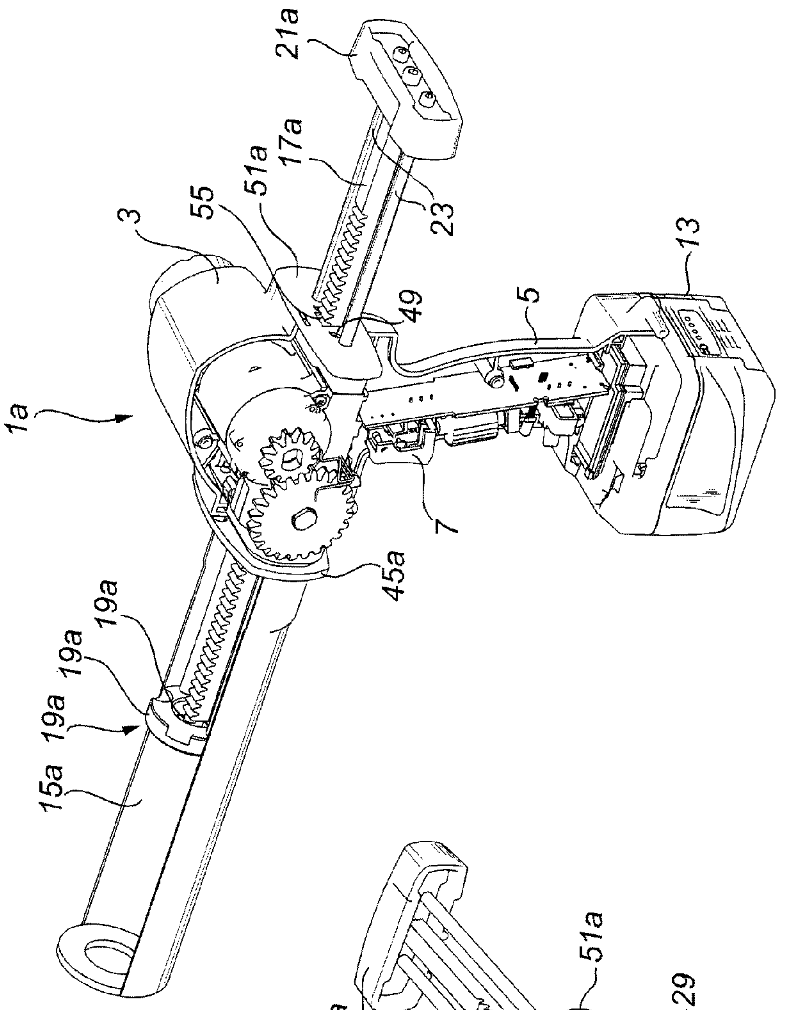
Figure 3:
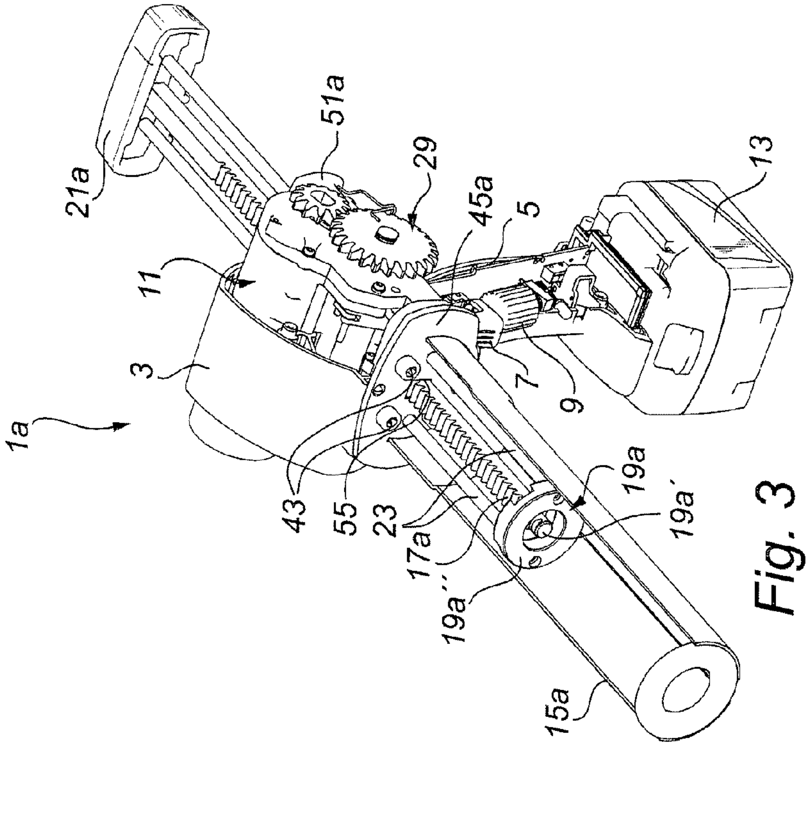

FIGS. 3 and 4 show a similar dispenser 1*a* comprising a housing identical the housing 3 including the drive unit 11, which are thus referred to by the same reference numerals 3 and 11. However the holder 15*a* of the dispenser 1*a* is adapted to hold only one container of viscous material.

Being adapted for two containers of viscous material to be dispensed simultaneously the dispenser 1 (FIGS. 1 and 2) comprises two racks 17 either of which at a respective front end is carrying a piston 19 for driving the viscous material for dispensing the same as it is well known by the skilled person. The racks 17 are extending through the drive unit 11 as it will be further explained below and at a rear end opposite the front end either rack 17 is attached to a second handle 21.

Being adapted for only one container of viscous material the dispenser 1*a* comprise only one rack 17*a* carrying at its front end a coaxial piston 19*a*. At its rear end opposite the front end the rack 17*a* is like in the dispenser 1 carrying a second handle 21*a*. Guide rods 23 are extending parallel to the rack 17*a* between the piston 19*a* and the second handle 21*a*. The piston 19*a* comprises a first central piston part 19*a*' constituted by the end of the rack 17*a* and a second annular piston part 19*a*", which is supported by the guide rods 23. Being connected through the second handle 21*a* the rack 17*a* and the guide rods 23, and thus the first and the second piston parts 19*a*' and 19*a*", move in unison. The dispenser of the embodiment shown in FIGS. 3 and 4 may be used with a container of viscous material containing only one component of viscous material and with a container of viscous material, a so-called coaxial container, containing two components of viscous material arranged coaxially in the container and separated by an annular partition inside the container.

Referring especially to FIGS. 5, 6 and 9 to 15, the drive unit 11 comprises a drive unit housing 25 accommodating an electric motor 27 driving through a gear train 29 a cylindrical pinion gear 31 with straight teeth 33. The drive unit housing 25 comprises a through channel 35 for accommodating the racks 17, 17*a*, and any guide rods 23. The through channel extends in a longitudinal direction 37 (see FIG. 10) from front to rear of the drive unit 11 and the cylindrical pinion gear has an axis of rotation 39 extending perpendicular to the longitudinal direction. Teeth 33 of the pinion gear 31 extends into the through channel 35 to mesh with any rack 17*a* or racks 17 accommodated in the through channel 35.

Figure 11:
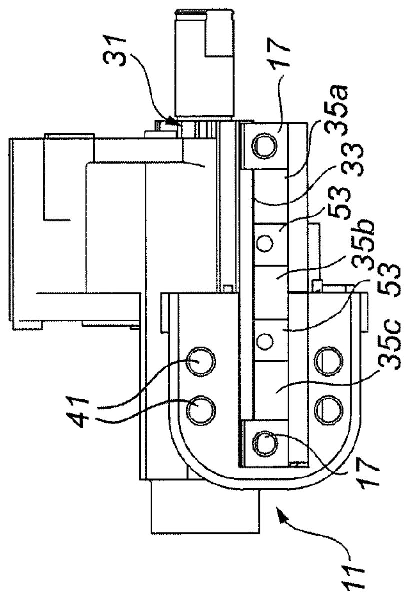
Figure 10:
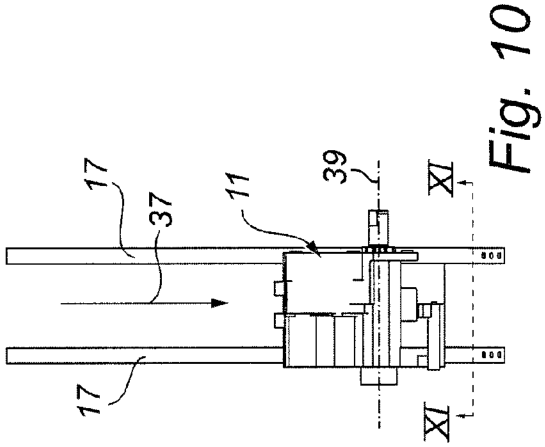
Figure 15:
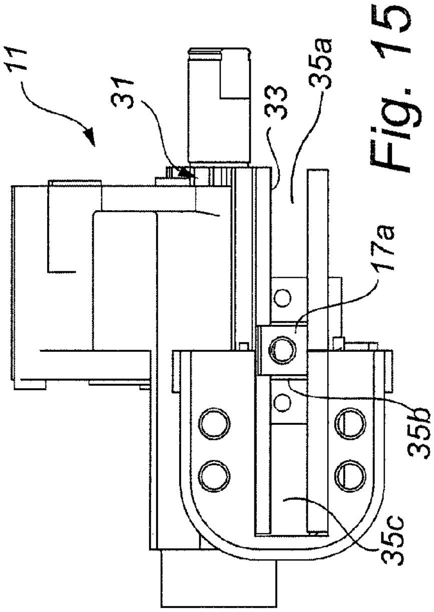
FIG. 15 is a section along the line XV-XV in FIG. 14.
Figure 14:
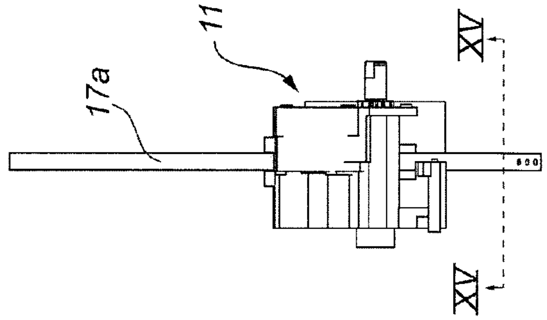
FIG. 14 shows a third view from above of the drive unit with one rack.
Figure 13:
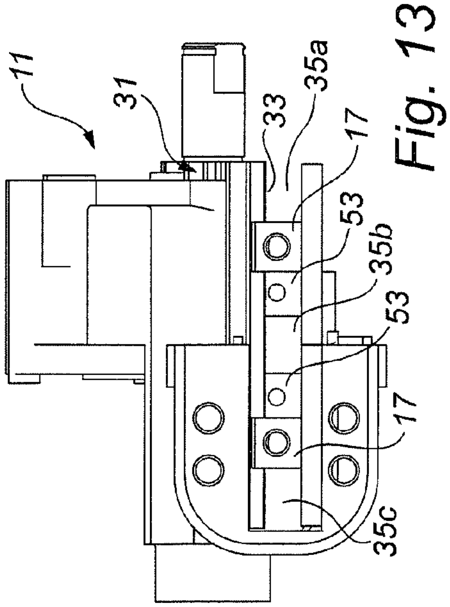
FIG. 13 is a section along the line XIII-XIII in FIG. 12
Figure 12:
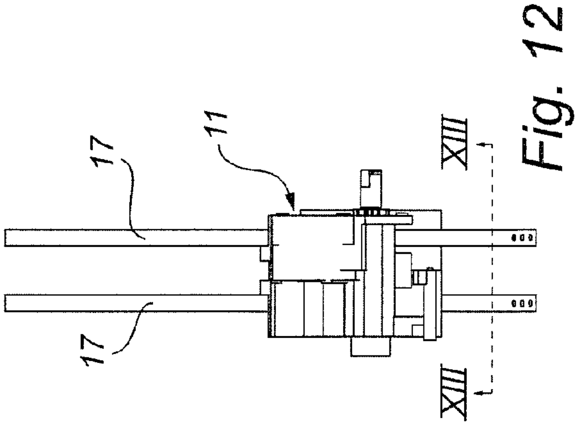
FIG. 12 shows a second view from above of the drive unit with two racks.

The drive unit has at its front end eight holes such as screw holes 41 of receiving mechanical fasteners such as screws 43 for mounting the holder 15, 15*a* and a guide piece 45, 45*a*. In the embodiments disclosed herein the guide piece 45, 45*a* is a part of the holder 15, 15*a*. At its rear end the drive unit has two holes such as screw holes 47 of receiving mechanical fasteners such as screws 49 for mounting a rear piece 51, 51*a*. In the present embodiment the screw holes 47 are provided in bridging pieces 53 bridging a rear opening of the through channel 35 thereby dividing, from a practical point of view, the through channel 35 into three sub-channels, namely a left sub-channel 35*a*, a central sub-channel 35*b* and a right sub-channel 35*c*. Especially the left and right sub-channel 35*a*, 35*c* each has a width larger than the width of the racks 17 thus allowing the racks to be shifted laterally in a direction of the axis of rotation 39 inside the left and right sub-channel 35*a*, 35*c*. Being intended for accommodating only a single central rack 17*a* the central sub-channel 35*b* need not be wider than necessary to accommodate a rack. The left and right sub-channels 35*a*, 35*c* has widths allowing to racks 17 to be displaced between the minimum and maximum mutual distance intended for racks 17 of a dispenser for dispensing simultaneously two components of viscous material. Thus FIGS. 10 and 11 show the drive unit 11 with two racks 17 placed in the left and right sub-channels 35*a*, 35*c* at a maximum mutual distance, while FIGS. 12 and 13 show the drive unit 11 with two racks 17 placed in the left and right sub-channels 35*a*, 35*c* at a minimum mutual distance, and FIGS. 14 and 15 show a single rack 17*a* placed in the central sub-channel 35*b*.

Alternatively the screw holes 47 could like the screw holes 41 be placed beside the through channel and the bridging pieces 53 could be omitted providing a single wide through channel.

The guide pieces 45, 45*a* and the rear pieces 51, 51*a* has apertures 55 through which the respective racks 17, 17*a* extend and which position the racks 17, 17*a* laterally in the direction of the axis of rotation 39. The apertures 55 may as shown in FIGS. 1 to 8 be shaped and dimensioned to fit a single rack. Alternatively an aperture may be provided with notches and/or recesses allowing one or more racks to be accommodated in the aperture at a number of fixed positions.

Viscous materials to be dispensed are usually delivered in a container or a set of containers (two-component material) in accordance with the nature of the viscous material and its intended manner of dispensing. The dispenser for dispensing the viscous material should match the container or set of containers and thus different dispensers are produced to match different containers or sets of containers.

To produce a dispenser according to the invention adapted for a given container or set of containers a housing 3 with a drive unit 11 is provided, a holder 15, 15*a* adapted to the container or set of containers in question is provided, a guide piece 45, 45*a* is provided as part of the holder 15, 15*a*, or in the alternative if the guide piece is not part of the holder an individual guide piece is provides, a rear piece 51, 51*a* is provided, one or more racks 17, 17*a* and pistons 19, 19*a* and possibly guide rods 23 are provided as the need may be, and a second handle 21, 21*a* is provided, and the parts are assembled.

It is under stood that a number of the parts may need to be dedicated to the dispenser to be produced. Especially the guide piece 45, 45*a* and the rear piece 51, 51*a* must comprise one or more apertures 55 providing for positioning the rack 17*a* or racks 17 at intended lateral positions. However, at least the drive unit 11, and in the present embodiments the entire housing 3 including the drive unit 11 is a standard component usable for a range of different dispensers adapted for different containers or sets of containers of material to be dispensed. Thus according to the represent invention a need for producing a variety of drive units is avoided, which is a major advantage since the drive unit is the single most complicated component of the dispenser.

The invention claimed is:

1. A motorized viscous material dispenser (1; 1*a*), comprising, a drive unit (11) with a cylindrical pinion gear (31), a holder (15; 15*a*) attachable to a front side of the drive unit (11) for receiving at least one container containing viscous material, at least one piston (19; 19*a*), at least one rack (17; 17*a*) meshing with the cylindrical pinion gear (31) to drive said piston (19; 19*a*), a rear piece (51; 51*a*), and a guide piece (45; 45*a*), wherein:

the drive unit (11) has a through channel (35) accommodating the at least one rack (17; 17*a*), said through channel (35) having a width providing for lateral displacement of the rack (17) in a direction of the rotational axis (39) of the cylindrical pinion gear (31), the rear piece (51; 51*a*) and the guide piece (45; 45*a*) are separate to each other and separate to the drive unit (11), the rear piece (51; 51*a*) is attachable to a rear side of the drive unit (11) opposite the front side, the guide piece (45; 45*a*) is attachable to the front side of the drive unit (11), said guide piece (45; 45*a*) and said rear piece (51; 51*a*) have guiding apertures (55) through which the rack (17; 17*a*) extends, and said guiding apertures (55) determine the position of the rack (17; 17*a*) relative to the cylindrical pinion gear (31), when the motorized viscous material dispenser (1; 1*a*) is assembled.

2. The dispenser according to claim 1, wherein the dispenser is a caulking gun.

3. The dispenser according to claim 1, wherein the guide piece (45; 45*a*) is a part of the holder (15; 15*a*).

4. The dispenser according to claim 1, wherein the guide piece (45; 45*a*) and the rear piece (51; 51*a*) are fastened to the drive unit by mechanical fasteners (43, 49).

5. The dispenser according to claim 1, further comprising more pistons (19) and more racks (17) each rack (17) being guided by apertures (55) of the guide piece (45) and the rear piece (51).

6. The dispenser according to claim 1, further comprising at least one guide rod (23) extending parallel to the at least one rack (17*a*).

7. The dispenser according to claim 1, further comprising an electric motor (27) driving the pinion gear (31).

8. The dispenser according to claim 7, further comprising a battery (13) for energizing the electric motor (27).

9. The dispenser according to claim 1, wherein the pinion gear (31) has straight teeth (33).

10. The dispenser according to claim 1, wherein the rack defines a longitudinal axis and wherein the lateral displacement of the rack is a displacement transverse to said longitudinal axis.

11. The dispenser according to claim 10, wherein said longitudinal axis is parallel to a direction of movement of the rack when driving said piston.

12. The dispenser according to claim 10, wherein the lateral displacement of the rack is a displacement perpendicular to said longitudinal axis.

13. The dispenser according to claim 1, wherein the cylindrical pinion gear comprises teeth extending into the through channel to allow both a single rack or more than one rack to be accommodated in the through channel to mesh with the teeth of the pinion gear.

14. The dispenser according to claim 1, wherein the pinion gear extends across the entire width of the through channel.

* * * * *